(12) United States Patent
Uchi et al.

(10) Patent No.: US 11,230,037 B2
(45) Date of Patent: Jan. 25, 2022

(54) MOLD DEVICE AND METHOD FOR MANUFACTURING RESIN MOLDED ARTICLE

(71) Applicant: HONDA MOTOR CO., LTD., Tokyo (JP)

(72) Inventors: Tomoyuki Uchi, Tochigi-ken (JP); Hiroshi Matsushima, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/649,719

(22) PCT Filed: Sep. 20, 2018

(86) PCT No.: PCT/JP2018/034765
§ 371 (c)(1),
(2) Date: Mar. 23, 2020

(87) PCT Pub. No.: WO2019/065433
PCT Pub. Date: Apr. 4, 2019

(65) Prior Publication Data
US 2020/0254660 A1    Aug. 13, 2020

(30) Foreign Application Priority Data

Sep. 26, 2017    (JP) .............................. JP2017-184873

(51) Int. Cl.
*B29C 45/04*    (2006.01)
*B29C 45/44*    (2006.01)
*B29C 45/80*    (2006.01)

(52) U.S. Cl.
CPC ............ *B29C 45/045* (2013.01); *B29C 45/44* (2013.01); *B29C 45/80* (2013.01); *B29C 2045/0458* (2013.01)

(58) Field of Classification Search
CPC . B29C 33/26; B29C 45/44; B29C 2045/0466; B29C 45/48; B29C 45/45
(Continued)

(56) References Cited

U.S. PATENT DOCUMENTS

| 2013/0014887 A1* | 1/2013 | Jagos ...................... B29C 33/44 156/245 |
| 2016/0185022 A1* | 6/2016 | Uchi ................... B29C 45/4471 264/318 |
| 2018/0221945 A1* | 8/2018 | Masuzawa ............. B22D 17/24 |

FOREIGN PATENT DOCUMENTS

| JP | 60-064821 | 5/1985 |
| JP | 61-002914 | 1/1986 |

(Continued)

OTHER PUBLICATIONS

International Search Report and Written Opinion for International Application No. PCT/JP2018/034765 dated Oct. 23, 2018, 8 pages.
(Continued)

*Primary Examiner* — Matthew J Daniels
*Assistant Examiner* — Hana C Page
(74) *Attorney, Agent, or Firm* — Amin, Turocy & Watson, LLP

(57) ABSTRACT

This mold device has a rotary core that rotates about a shaft member as a rotation center by being provided with a rotational driving force directly from a rotation driving means. A restriction core is interposed between the rotary core and a mold body to restrict the rotation of the rotary core. That is, the rotary core becomes rotatable when the restriction core is withdrawn from between the rotary core and the mold body.

6 Claims, 5 Drawing Sheets

(58) Field of Classification Search
USPC .......................................................... 264/40.7
See application file for complete search history.

(56) References Cited

FOREIGN PATENT DOCUMENTS

| JP | 04-308716 | 10/1992 |
|---|---|---|
| JP | 06-114893 | 4/1994 |
| JP | 6109809 | 4/2017 |

OTHER PUBLICATIONS

Japanese Office Action for Japanese Patent Application No. 2019-545019 dated Nov. 24, 2020.

* cited by examiner

MOLD DEVICE AND METHOD FOR MANUFACTURING RESIN MOLDED ARTICLE

TECHNICAL FIELD

The present invention relates to a mold device for obtaining a resin molded article with a main body portion and an undercut portion and a method for producing the resin molded article.

BACKGROUND ART

Using a rotary core to form a cavity for forming the shape of an undercut portion of a resin molded article is known (see, for example, Japanese Laid-Open Patent Publication No. 06-114893). This case has an advantage in that, by rotating a rotary core after a resin molded article with an undercut portion is obtained, the rotary core can be easily released from the undercut portion.

When molten resin is injected into the cavity, resin pressure is applied to a mold main body and a cavity forming surface of the rotary core. The rotary core is pushed toward the mold main body by this resin pressure. That is, the mold main body interferes with the rotary core. When the mold main body interferes with the rotary core largely, it is feared that it is difficult for the rotary core to rotate, in other words, to be released from the undercut portion. To wipe out this fear, the applicant proposes, in Japanese Patent No. 6109809, a mold device that puts a regulating core between a rotary core and a mold main body at the time of molding and removes the regulating core from between the rotary core and the mold main body after the completion of molding. In this mold device, a space is formed on the site of the regulating core, whereby the rotary core rotates with ease.

SUMMARY OF INVENTION

Attempts to increase the injection pressure of molten resin have been made in recent years and the resin pressure acting on a cavity forming surface tends to increase in line therewith. For this reason, preventing a rotary core from being pushed toward a mold main body, in other words, firmly positioning the rotary core is required.

A main object of the present invention is to provide mold device that can prevent a rotary core from being pushed by resin pressure at the time of molding.

Another object of the present invention is to provide a method for producing a resin molded article that can be implemented using the above-described mold device.

According to an embodiment of the present invention, mold device that forms the shape of a resin molded article including a main body portion and an undercut portion is provided. The mold device includes: a mold main body that molds the main body portion; a rotary core that molds the undercut portion and is released from the undercut portion by rotating in the direction in which the rotary core moves away from the undercut portion; a regulating core that regulates the rotation of the rotary core by entering between the mold main body and the rotary core and supporting the rotary core at the time of molding and moves away from between the mold main body and the rotary core when the rotary core is released from the undercut portion; a shaft member that pivotally supports the rotary core on the mold main body and serves as the center of rotation of the rotary core; and a rotary driving unit that rotates the rotary core using the shaft member as the center of rotation by providing a rotary driving force to the rotary core.

According to another embodiment of the present invention, a method for producing a resin molded article including a main body portion and an undercut portion is provided. The method includes: a molding step of injecting resin in a state in which the rotation of a rotary core is regulated by putting a regulating core between a mold main body that molds the main body portion and the rotary core that molds the undercut portion and supporting the rotary core by the regulating core; and a release step of freeing the rotary core from regulation by moving the regulating core in the direction in which the regulating core moves away from between the mold main body and the rotary core and by releasing the rotary core from the undercut portion by rotating the rotary core in the direction in which the rotary core moves away from the undercut portion under the action of a rotary driving unit.

As described above, in the present invention, the rotary driving force is directly input to the rotary core from the rotary driving unit. This allows the rotary core to be firmly positioned, which makes it possible to prevent the rotary core from being pushed toward the regulating core that supports the rotary core even when molten resin is introduced into a cavity and the rotary core is subjected to resin pressure at the time of molding.

As a result, the interference of the rotary core with the regulating core is avoided, which allows the regulating core to easily move away from between the rotary core and the mold main body at the time of release for mold opening. The rotary core rotates and moves to a space that has been formed as a result of the regulating core being retracted, which makes it easy for the rotary core to rotate. That is, the rotary core smoothly is released from the undercut portion.

It is preferable to provide, from the rotary driving unit, the rotary driving force in the direction in which the rotary core is moved toward the cavity at the time of molding. This rotary driving force serves as drag acting opposite to the resin pressure. Thus, the rotary core is positioned more firmly, which makes it possible to more effectively prevent the rotary core from being pushed toward the regulating core.

When a driving force transmission shaft that transmits the rotary driving force of the rotary driving unit to the rotary core is provided, it is preferable that the driving force transmission shaft is disposed with an offset (displacement) with respect to the shaft member. In this case, there is no need to dispose the rotary driving unit near the shaft member. Thus, the placement layout of the rotary driving unit is improved and flexibility in the design of the mold device is increased.

Moreover, it is preferable to provide, in the rotary core, a stopper that abuts on the mold main body and maintains the rotary core in a stopped position at the time of molding. In particular, when the rotary driving force in the direction in which the rotary core is moved toward the cavity is provided from the rotary driving unit as described above, it is possible to prevent the rotary core from actually rotating. That is, it is possible to prevent the further rotation of the rotary core while providing the rotary driving force that serves as drag.

In general, a greater driving force is needed when the regulating core that intervenes between the rotary core and a stationary mold as a wedge is moved away from between the rotary core and the stationary mold than when the regulating core is made to enter between the rotary core and the stationary mold and interposed therebetween (as a wedge); therefore, it is preferable to provide a structure that facilitates moving the regulating core away therefrom. Specifically, it is preferable to provide, in the regulating core, an abutment member that is elastically biased (pressed) toward the mold main body and protrudes from the regulating core and abuts on the mold main body.

An elastic member that elastically biases the abutment member is compressed when the abutment member abuts on the mold main body. When the regulating core is moved away (retracted) from between the rotary core and the mold main body, the elastic member expands because the pressing force from the mold main body gradually decreases. Since the abutment member presses the mold main body with this expansion, the regulating core is pushed out in the direction in which the regulating core moves away from between the rotary core and the mold main body. This facilitates moving the regulating core away therefrom.

Thus, there is no need to adopt a driving source that produces a great thrust force as a driving source for making the regulating core enter between the rotary core and the mold main body or retracting the regulating core therefrom. This makes it possible to make the mold device compact and reduce capital investment.

According to the present invention, the rotary driving unit that inputs the rotary driving force to the rotary core is provided. Since the rotary core is firmly positioned under the action of this rotary driving unit, even when the resin pressure acts on the rotary core from the molten resin introduced into the cavity at the time of molding, it is possible to prevent the rotary core from being pushed toward the regulating core that supports the rotary core.

As a result, the regulating core easily moves away from between the rotary core and the mold main body. This makes it easy for the rotary core to rotate and move to a space that has been formed as a result of the regulating core being retracted, and the rotary core smoothly is released from the undercut portion of the resin molded article.

DESCRIPTION OF EMBODIMENTS

Hereinafter, a preferred embodiment of a method for producing a resin molded article according to the present invention will be described in detail in connection with mold device for implementing the method with reference to the accompanying drawings.

Figure 1:
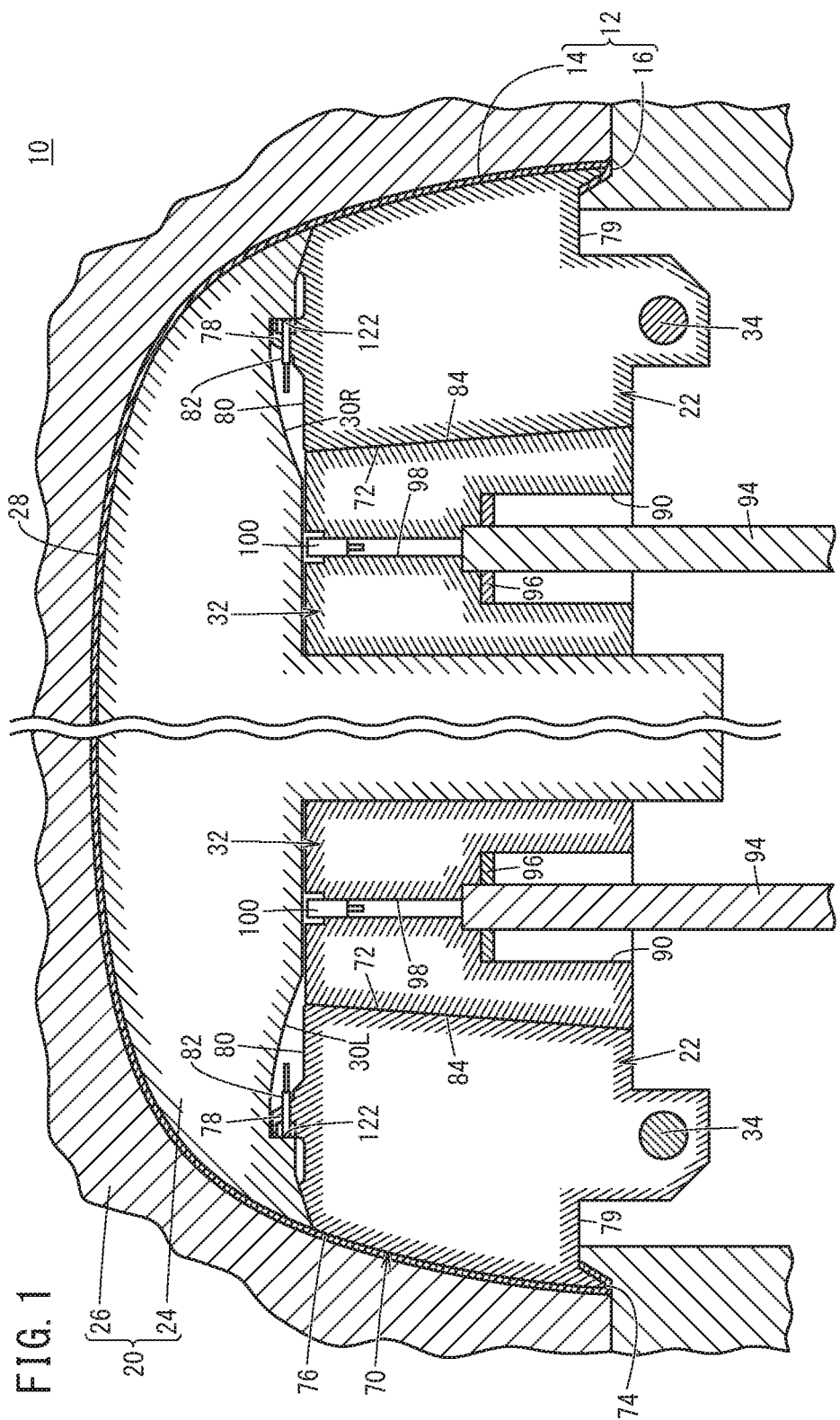
FIG. 1 is a schematic longitudinal sectional view of principal portions of a mold device according to an embodiment of the present invention.

FIG. 1 is a schematic longitudinal sectional view of principal portions of a mold device 10 according to the present embodiment. This mold device 10 is a device for obtaining a bumper 12 of an automobile as a resin molded article. A general explanation of the bumper 12 is given below. The bumper 12 includes a main body portion 14 and an undercut portion 16 that is formed at an end of the main body portion 14. The undercut portion 16 that is substantially V-shaped in cross section serves as a hook portion for attaching the bumper 12 to a main body of a vehicle body.

The mold device 10 includes a mold main body 20 for molding mainly the main body portion 14 and two rotary cores 22 for molding mainly the undercut portion 16. The mold main body 20 includes a stationary mold 24 which is positioned and fixed and a movable mold 26 which moves close to or away from the stationary mold 24 under the action of an unillustrated lifting and lowering mechanism (for example, a hydraulic cylinder), and the stationary mold 24, the movable mold 26, and the two rotary cores 22 form a cavity 28 for obtaining the bumper 12. The movable mold 26 molds an outer surface (so-called design surface) which is visible to a user, and the stationary mold 24 molds the back side thereof.

The stationary mold 24 has a right housing recess portion 30R and a left housing recess portion 30L that are formed by hollowing the stationary mold 24. A rotary core 22 and a regulating core 32 are housed in the right housing recess portion 30R. Another rotary core 22 and another regulating core 32 are housed in the left housing recess portion 30L.

Hereinafter, a description will be given by taking up the rotary core 22 and the regulating core 32 that are housed in the right housing recess portion 30R as an example.

Figure 2:
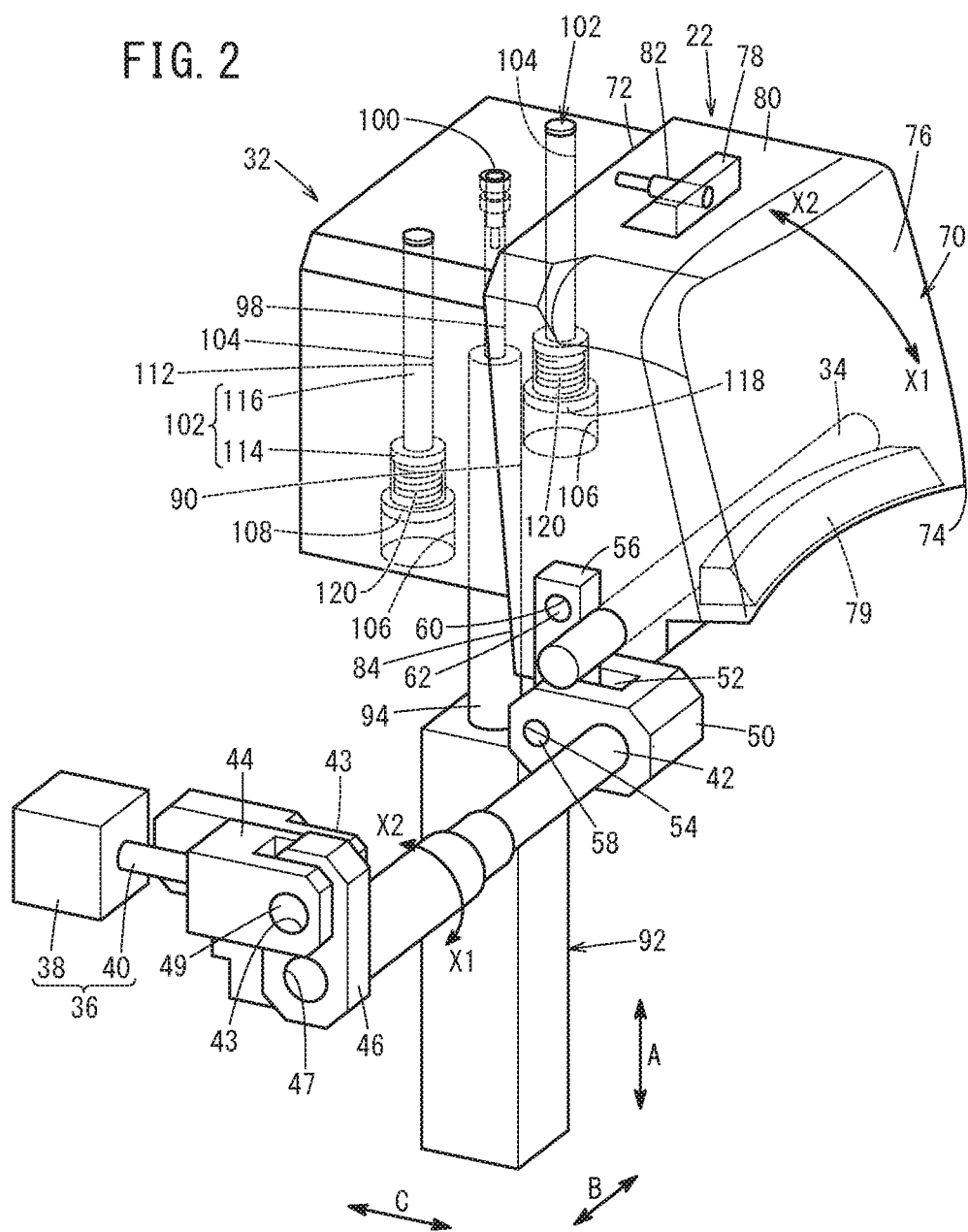
FIG. 2 is a schematic perspective view of principal portions which shows a rotary core, a regulating core, and a rotary cylinder (a rotary driving unit) that provides a rotary driving force to the rotary core, which make up the mold device of FIG. 1.

As shown in FIGS. 1 and 2, the rotary core 22 includes a shaft member 34 that is rotatably and pivotally supported on the stationary mold 24. As will be described later, this shaft member 34 serves as the center of rotation of the rotary core 22. The rotary core 22 rotates under the action of a rotary cylinder 36 that is a rotary driving unit. An end of a cylinder tube 38 that makes up the rotary cylinder 36 is connected to the stationary mold 24.

Figure 3:
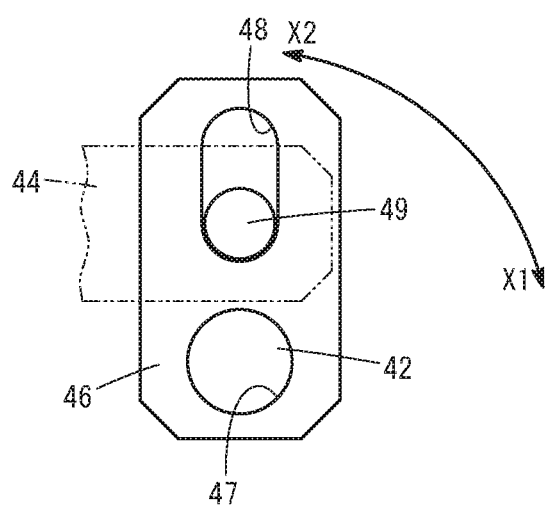
FIG. 3 is a schematic plan view of principal portions which shows a connection relationship between a bifurcated bracket, a first connecting board, and a pivot shaft which are shown in FIG. 2.

More specifically, a back-and-forth movement rod 40 of the rotary cylinder 36 and the rotary core 22 are connected via a rotary connecting shaft 42 (a driving force transmission shaft) extending in an arrow B direction in FIG. 2. That is, at the tip of the back-and-forth movement rod 40, a bifurcated bracket 44 with two wall portions facing each other, each having a shaft hole 43 formed therein, is provided. Meanwhile, a first connecting board 46 extending in an arrow A direction is fitted onto one end of the rotary connecting shaft 42. In the first connecting board 46, a fitting hole 47 into which the one end of the rotary connecting shaft 42 is fitted and an elongated hole 48 shown in FIG. 3 are formed. A pivot shaft 49 inserted into one of the shaft holes 43 is passed through the elongated hole 48 and is then inserted into the other shaft hole 43. The back-and-forth movement rod 40 of the rotary cylinder 36 and the rotary connecting shaft 42 are connected via this pivot shaft 49.

A U-shaped bracket 50 that is substantially U-shaped and extends in an arrow C direction is connected to the other end of the rotary connecting shaft 42. Insertion holes 54 are formed near a U groove 52 that opens, of the U-shaped bracket 50, on a side facing the regulating core 32. In a flat plate-like second connecting board 56 inserted into the U groove 52, a through hole (which is not shown in the drawings) that is continuous with the insertion holes 54 is formed. The second connecting board 56 is connected to the U-shaped bracket 50 via a first transmission shaft 58 fitted into the insertion holes 54 and the through hole.

A connecting hole 60 is further formed in the second connecting board 56. On the other hand, a press-fit hole (which is not shown in the drawing) is formed in a position, which corresponds to the position of the connecting hole 60, in the rotary core 22. A second transmission shaft 62 that is passed through the connecting hole 60 is fitted into the press-fit hole, whereby the rotary connecting shaft 42 is connected to the rotary core 22 via the U-shaped bracket 50 and the second connecting board 56.

The U-shaped bracket 50 is located below the shaft member 34. That is, the center of the rotary connecting shaft 42 is disposed with an offset from the center of the shaft member 34. As described above, by disposing the rotary connecting shaft 42 with an offset from the shaft member 34 (the center of rotation of the rotary core 22), flexibility in the placement layout of the rotary cylinder 36 is enhanced. Therefore, flexibility in the design of the mold device 10 is increased.

The rotary core 22 includes a cavity forming surface 70 facing the cavity 28 and a supported surface 72 facing the regulating core 32. The cavity forming surface 70 includes an undercut portion molding surface 74, a curved surface 76 stretching toward the undercut portion molding surface 74, and an upper surface 80 that is provided with a stopper portion 78 (a stopper) projecting toward the mold main body 20. A bottom notch 79 is formed near the undercut portion molding surface 74, and a detection portion of a first position sensor 82 is embedded in the stopper portion 78.

The supported surface 72 is an inclined surface that is slightly angled with respect to a vertical direction, inclined in a direction away from the regulating core 32 as the supported surface 72 comes close to the second connecting board 56. The supported surface 72 abuts on a regulating surface 84 of the regulating core 32 and is supported thereon. It goes without saying that the regulating surface 84 is inclined at an angle corresponding to the inclination angle of the supported surface 72 such that the regulating surface 84 is put more toward the rotary core 22 as the regulating surface 84 comes close to the second connecting board 56.

In the bottom of the regulating core 32, a fixed hole 90 extending toward the upper surface of the regulating core 32 is formed. An up-and-down movement rod 94 of a lifting and lowering cylinder 92 is inserted into the fixed hole 90. The up-and-down movement rod 94 is passed through a press-fitted ring 96 (see FIG. 1) press-fitted into the fixed hole 90 to prevent the up-and-down movement rod 94 from coming off the fixed hole 90. Therefore, the regulating core 32 enters the right housing recess portion 30R with the forward movement (upward movement) of the up-and-down movement rod 94 and is retracted from the right housing recess portion 30R with the downward movement (backward movement) of the up-and-down movement rod 94.

A small hole 98, the inner diameter of which is smaller than the inner diameter of the fixed hole 90, is continuous with the fixed hole 90. A second position sensor 100 is housed in the small hole 98.

Figure 4:
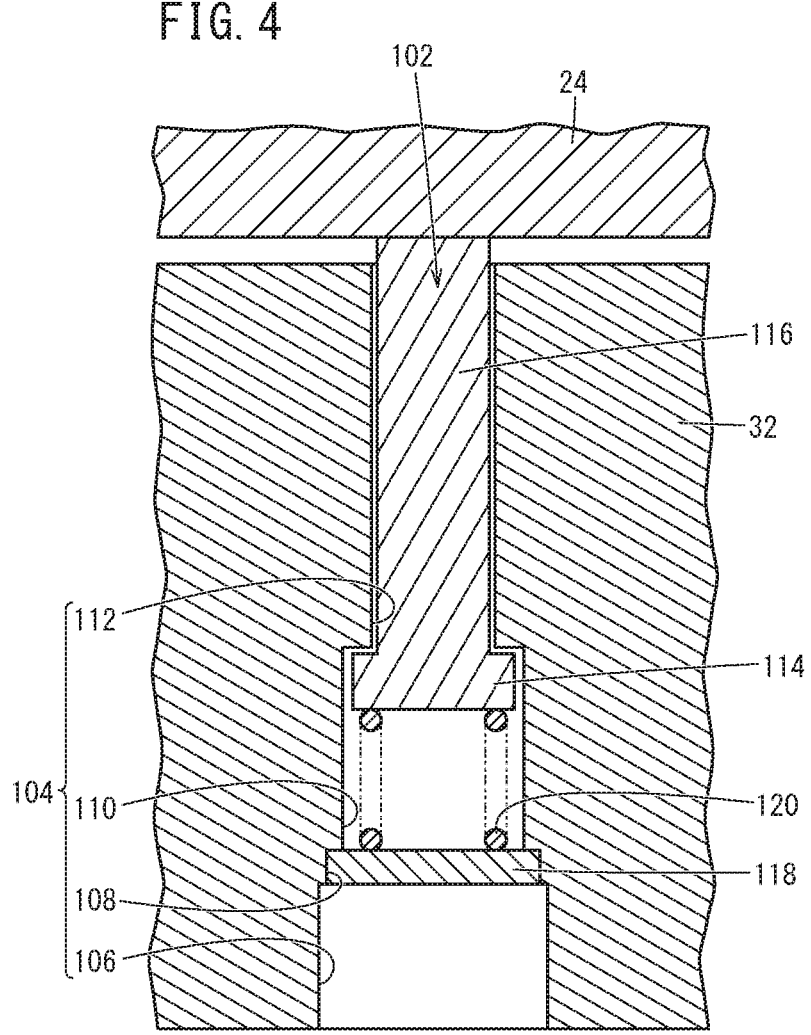
FIG. 4 is a schematic longitudinal sectional view of principal portions of the regulating core.

A housing hole 104 housing an abutment member 102 is further provided in the regulating core 32. As shown in FIG. 4, the housing hole 104 is made up of a large-diameter hole 106 with the largest inner diameter, an attachment hole 108 the diameter of which is slightly smaller than the diameter of the large-diameter hole 106, a medium-diameter hole 110 with a medium inner diameter, and a small-diameter hole 112 with the smallest inner diameter, with the large-diameter hole 106, the attachment hole 108, the medium-diameter hole 110, and the small-diameter hole 112 being continuous. Meanwhile, the abutment member 102 is made up of a large-diameter circular cylinder portion 114 the diameter of which is larger than the diameter of the small-diameter hole 112 and a small-diameter circular cylinder portion 116 that is passed through the small-diameter hole 112, the distal end of the small-diameter circular cylinder portion 116 protruding from the small-diameter hole 112. Moreover, a closing cap 118 is attached to the attachment hole 108, whereby the housing hole 104 is closed.

A coil spring 120 is inserted between the closing cap 118 and the large-diameter circular cylinder portion 114. The abutment member 102 is elastically biased (pressed) toward the movable mold 26 by this coil spring 120. By being elastically biased in this way, the distal end of the small-diameter circular cylinder portion 116 that makes up the abutment member 102 protrudes from the regulating core 32 all the time.

The rotary core 22 and the regulating core 32 that are housed in the left housing recess portion 30L are also constructed in the same manner as that described above; therefore, the same constituent element is identified with the same reference character and the detailed explanations thereof are omitted.

In the stationary mold 24, a holding portion 122 that stops the movement of the stopper portion 78 and holds the stopper portion 78 is formed, projecting toward the rotary core 22. A neighborhood of the holding portion 122 is cut so as to be curved, allowing the stopper portion 78 to make a rotary movement so as to move close to or retract from the holding portion 122.

The mold device 10 further includes an unillustrated injection machine. Molten resin is injected from this injection machine and introduced into the cavity 28 through an unillustrated passage.

In the above-described construction, the lifting and lowering mechanism, the rotary cylinder 36, the lifting and lowering cylinder 92, the first position sensor 82, the second position sensor 100, and the injection machine are electrically connected to an unillustrated control circuit.

The mold device 10 according to the present embodiment is basically constructed as described above; next, the workings and effects thereof will be described in connection with the method for producing the bumper 12 (the resin molded article) according to the present embodiment. The following operations are executed under the control of the control circuit.

Figure 5:
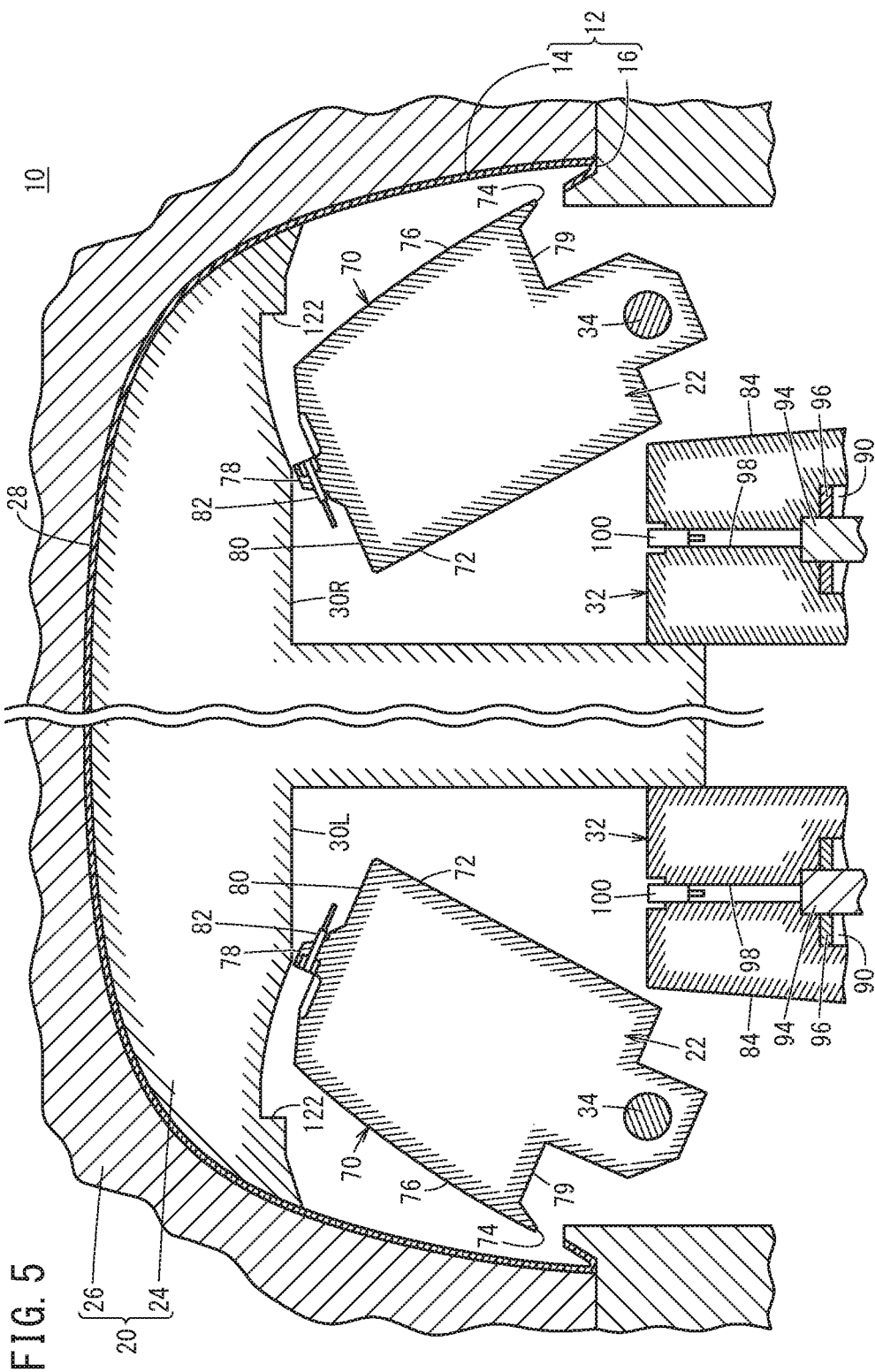
FIG. 5 is a schematic longitudinal sectional view of principal portions that shows a state in which each regulating core has been retracted from FIG. 1 and each rotary core has been rotated.

First, the movable mold 26 moves close to the stationary mold 24 under the action of the lifting and lowering mechanism, whereby mold closing is performed and a state shown in FIG. 5 is obtained. Next, the back-and-forth movement rod 40 (see FIG. 2) moves forward in the arrow C direction. With this forward movement, the pivot shaft 49 relatively moves in the elongated hole 48 (see FIG. 3). As a result, the first connecting board 46 pivots about the fitting hole 47 in an arrow X1 direction in FIG. 2 and the rotary connecting shaft 42 rotates in the arrow X1 direction because one end of the rotary connecting shaft 42 is fitted into the fitting hole 47. Furthermore, the U-shaped bracket 50 connected to the other end of the rotary connecting shaft 42 rotates in the arrow X1 direction and, following this rotation, the second connecting board 56 inserted into the U groove 52 and connected to the U-shaped bracket 50 via the first transmission shaft 58 rotates in the same direction.

Since the second connecting board 56 rotates, the rotary core 22 connected to the second connecting board 56 via the second transmission shaft 62 rotates about the center of rotation in the same direction as the second connecting board 56. As a result, the rotary core 22 is in a posture shown in FIGS. 1 and 2. When the rotary core 22 rotates, the stopper portion 78 rotates and moves along the curve near the holding portion 122 and then abuts on the holding portion 122 and is held thereby. This stops the rotation of the rotary core 22. That is, the rotary core 22 is positioned. This stopped state is detected by the first position sensor 82, and, by receiving the detection signal produced thereby, the control circuit recognizes that "the stopper portion 78 has been held and the rotary core 22 has been stopped".

After the rotary core 22 is stopped, the rotary cylinder 36 continues biasing the back-and-forth movement rod 40. That is, a force that moves the back-and-forth movement rod 40 forward is applied to the back-and-forth movement rod 40. Therefore, a rotary driving force that moves the rotary core 22 toward the cavity 28 is provided to the rotary core 22 via the first connecting board 46, the rotary connecting shaft 42, and the second connecting board 56. However, since the stopper portion 78 abuts on the holding portion 122 as described above, the rotary core 22 does not rotate any further.

Next, each lifting and lowering cylinder 92 is biased, which makes each up-and-down movement rod 94 and each regulating core 32 move upward in an integrated manner. The regulating cores 32 that moved upward enter the left housing recess portion 30L and the right housing recess portion 30R and each intervene between the corresponding rotary core 22 and the stationary mold 24 as shown in FIG. 1. When the regulating cores 32 enter the left housing recess portion 30L and the right housing recess portion 30R, the regulating surfaces 84 are in sliding contact with the supported surfaces 72. Since the regulating surface 84 and the supported surface 72 are inclined and therefore both surfaces serve as cam surfaces, each regulating core 32 can easily enter between the corresponding rotary core 22 and the stationary mold 24 easily. As described above, the regulating core 32 intervenes between the rotary core 22 and the stationary mold 24 and functions as a wedge in a state in which the regulating surface 84 abuts on the supported surface 72.

When the regulating cores 32 move upward by a predetermined amount, the second position sensors 100 detect that the ceiling surfaces of the left housing recess portion 30L and the right housing recess portion 30R are approaching the second position sensors 100 and transmit detection signals to the control circuit. The control circuit that has received the detection signals stops the up-and-down movement rods 94. When the up-and-down movement rods 94 are stopped, the regulating cores 32 are also stopped. Then, a small clearance is formed between the upper surface of the regulating core 32 and the ceiling surface of the left housing recess portion 30L and between the upper surface of the regulating core 32 and the ceiling surface of the right housing recess portion 30R.

Here, the distal end of the small-diameter circular cylinder portion 116 of the abutment member 102 protrudes from the housing hole 104 of each regulating core 32. Each protruding distal end abuts on the ceiling surfaces of the left housing recess portion 30L and the right housing recess portion 30R. Since the regulating cores 32 still move upward slightly, the coil springs 120 are compressed.

The cavity 28 is formed as a result of the mold closing and the rotation of the rotary cores 22 being performed in this way and the regulating cores 32 entering the left housing recess portion 30L and the right housing recess portion 30R as described above. Next, the control circuit injects molten resin by energizing the injection machine. As a result, a molding step is performed.

The injected molten resin reaches the cavity 28 through the passage. That is, the cavity 28 is filled with the molten resin. Thus, resin pressure pointing toward the regulating cores 32 acts on the curved surfaces 76 and the undercut portion molding surfaces 74 of the rotary cores 22.

Even during this molding step, the rotary driving force that moves each rotary core 22 toward the cavity 28 is provided to the rotary core 22 as described above. Because this rotary driving force serves as reaction force and each regulating core 32 functions as a wedge, the rotary core 22 is prevented from being pushed toward the regulating core 32 even though the resin pressure is acting on the rotary core 22. In other words, the rotary core 22 maintains the position thereof.

The technique described in Japanese Patent No. 6109809 indirectly rotates the rotary core by providing a rotary driving force to the regulating core. On the other hand, in the present embodiment, the rotary cylinder 36 that is a rotary driving unit is provided and the rotary driving force is directly input to the rotary core 22 from the rotary cylinder 36. This allows the rotary core 22 to be firmly positioned, whereby it becomes possible to prevent the rotary core 22 from being pushed toward the regulating core 32 as described above even when the rotary core 22 is subjected to the resin pressure.

The bumper 12 whose shape corresponds to the shape of the cavity 28 is obtained as a result of the molten resin injected into the cavity 28 being cooled and solidified. The bumper 12 includes the main body portion 14 that is molded mainly by the stationary mold 24 and the movable mold 26, and the undercut portion 16 that is molded by the undercut portion molding surface 74 and the bottom notch 79.

Next, a release step is performed. To perform this step, the control circuit performs control so that the above-described operations are performed in reverse order. That is, first, the control circuit moves each up-and-down movement rod 94 downward and thereby moves each regulating core 32 downward in an integrated manner. At the start of this downward movement, the upper surfaces 80 of the regulating cores 32 do not abut on the ceiling surfaces of the left housing recess portion 30L and the right housing recess portion 30R. Moreover, when the downward movement is started, since the small-diameter circular cylinder portions 116 of the abutment members 102 start to move away from the ceiling surfaces, the compressed coil springs 120 extend. As a result, the abutment members 102 are elastically biased toward the movable mold 26 and the distal ends of the abutment members 102 press the ceiling surfaces. By this pressing, the regulating cores 32 are pushed out in the direction in which the regulating cores 32 are moved downward.

In general, a greater driving force is needed when each regulating core 32 is moved away from between the corresponding rotary core 22 and the stationary mold 24 (is moved downward) than when each regulating core 32 is made to enter between the corresponding rotary core 22 and the stationary mold 24 (is moved upward). However, according to the present embodiment, the regulating core 32 is assisted to move downward in the above-described manner. Thus, it is possible to reduce the driving force needed for downward movement as compared to when the abutment member 102 is not provided.

In addition, in the present embodiment, the rotary core 22 is prevented from being pushed toward the regulating core 32 at the time of the molding step as described above. This results in the avoidance of the interference of the rotary core 22 with the regulating core 32 and thus the regulating core 32 smoothly moves downward without being interfered with by the rotary core 22. As a result, the rotary core 22 is freed from the regulation by the regulating core 32.

The control circuit, which has recognized the completion of the downward movement of each regulating core 32, then moves the back-and-forth movement rod 40 (see FIG. 2) of the rotary cylinder 36 backward in the arrow C direction. As a result, the first connecting board 46 pivots about the fitting hole 47 in an arrow X2 direction in FIG. 2. Following this movement, the U-shaped bracket 50 and the second connecting board 56 rotate in the arrow X2 direction. Since the regulating cores 32 are already retracted from the right housing recess portion 30R and the left housing recess portion 30L, the rotary core 22 also rotates in the arrow X2 direction in an integrated manner. As a result, the rotary core 22 moves away from the undercut portion 16. It is understood that the stopper portion 78 also moves away from the holding portion 122, and a state shown in FIG. 5 is obtained.

After the rotary core 22 is released from the undercut portion 16 in this way, the movable mold 26 is moved upward under the action of the lifting and lowering mechanism and moved away from the stationary mold 24. The bumper 12 exposed by this movement is pushed out by the upward movement of an unillustrated eject pin and released from the stationary mold 24.

The present invention is not limited to the above-described embodiment and can be modified as appropriate within the scope of the present invention.

For example, the rotary core 22 may be released from the undercut portion 16 after the movable mold 26 is moved upward and as a result moved away from the stationary mold 24.

Moreover, the bottom notch 79 may be a notch that also has an opening at each end face of the rotary core 22 in a width direction thereof (the arrow B direction), in other words, a notch that is formed so as to pass through the rotary core 22 in the width direction thereof.

Furthermore, the mold device 10 is not limited to equipment for forming the shape of the bumper 12 as a resin molded article and only has to be equipment that produces a resin molded article with the undercut portion 16.

REFERENCE SIGNS LIST 10 mold device
12 bumper
14 main body portion
16 undercut portion
20 mold main body
22 rotary core
24 stationary mold
26 movable mold
28 cavity
30R right housing recess portion
30L left housing recess portion
32 regulating core
34 shaft member
36 rotary cylinder
40 back-and-forth movement rod
42 rotary connecting shaft
46 first connecting board
56 second connecting board
58 first transmission shaft
62 second transmission shaft
70 cavity forming surface
72 supported surface
74 undercut portion molding surface
76 curved surface
78 stopper portion
82 first position sensor
84 regulating surface
92 lifting and lowering cylinder
94 up-and-down movement rod
100 second position sensor
102 abutment member
120 coil spring
122 holding portion

The invention claimed is:

1. A mold device that forms a cavity for molding a resin molded article including a main body portion and an undercut portion, the mold device comprising:
   a mold main body that molds the main body portion;
   a rotary core that molds the undercut portion and is released from the undercut portion by rotating in a direction in which the rotary core moves away from the undercut portion;
   a regulating core that regulates a rotation of the rotary core by entering between the mold main body and the rotary core and supporting the rotary core at a time of molding, moves away from between the mold main body and the rotary core when the rotary core is released from the undercut portion, and is apart from the mold main body and the rotary core;
   a shaft member that pivotally supports the rotary core on the mold main body and serves as a center of rotation of the rotary core;
   a rotary driving unit that rotates the rotary core using the shaft member as the center of rotation by providing a rotary driving force to the rotary core; and
   a lowering cylinder that moves the regulating core;
   wherein as a result of transmission of the rotary driving force from the rotary driving unit, the rotary core rotates independently of a movement of the regulating core, and
   the rotary driving unit provides, at a time of molding, the rotary core with the rotary driving force directed toward the cavity.

2. The mold device according to claim 1, further comprising:
   a driving force transmission shaft that transmits the rotary driving force of the rotary driving unit to the rotary core, wherein
   the driving force transmission shaft is disposed with an offset with respect to the shaft member.

3. The mold device according to claim 1, wherein
   in the rotary core, a stopper that abuts on the mold main body and maintains the rotary core in a stopped position at the time of molding is provided.

4. The mold device according to claim 1, wherein
   in the regulating core, an abutment member that is elastically biased toward the mold main body, and protrudes from the regulating core and abuts on the mold main body is provided.

5. The mold device according to claim 1, further comprising:
   a driving force transmission shaft that is connected to the rotary core and transmits the rotary driving force of the rotary driving unit to the rotary core.

6. The mold device according to claim 1, wherein the rotary driving unit comprises:
   a main body that is supported by the mold main body, and a rod that moves forward or backward with respect to the main body and is connected to a driving force transmission shaft.

* * * * *